United States Patent
Miller et al.

(10) Patent No.: US 12,418,408 B2
(45) Date of Patent: Sep. 16, 2025

(54) TECHNIQUES FOR SECURE TRANSFER OF CONTAINER IMAGES BY TRACKING LAYER TRANSFERS

(71) Applicant: CloudFit Software, LLC, Redmond, WA (US)

(72) Inventors: Brian Miller, Spout Spring, VA (US); Benjamin Lawrence Heatwole, Rockingham, VA (US)

(73) Assignee: CloudFit Software, LLC, Redmond, WA (US)

( * ) Notice: Subject to any disclaimer, the term of this patent is extended or adjusted under 35 U.S.C. 154(b) by 157 days.

(21) Appl. No.: 18/488,832

(22) Filed: Oct. 17, 2023

(65) Prior Publication Data

US 2025/0125947 A1   Apr. 17, 2025

(51) Int. Cl.
  *H04L 9/08*  (2006.01)
  *H04L 9/32*  (2006.01)

(52) U.S. Cl.
  CPC .......... *H04L 9/0825* (2013.01); *H04L 9/0894* (2013.01); *H04L 9/3247* (2013.01)

(58) Field of Classification Search
  None
  See application file for complete search history.

(56) References Cited

U.S. PATENT DOCUMENTS

| | | | | |
|---|---|---|---|---|
| 11,163,902 | B1* | 11/2021 | Clerget | H04L 9/3247 |
| 11,675,913 | B2* | 6/2023 | Wolfson | G06F 21/629 |
| | | | | 713/189 |
| 2002/0059519 | A1* | 5/2002 | Yamagishi | H04L 63/045 |
| | | | | 713/175 |
| 2022/0405373 | A1* | 12/2022 | Amaro, Jr. | H04L 9/3263 |
| 2023/0246821 | A1* | 8/2023 | Bursell | H04L 9/0825 |
| | | | | 713/171 |

* cited by examiner

*Primary Examiner* — Atta Khan
(74) *Attorney, Agent, or Firm* — Lee & Hayes, P.C.

(57) ABSTRACT

In some aspects, the techniques described herein relate to a system that is configured to perform operations including: generating first transfer data associated with transferring a first container image to a destination computer system, wherein the first container image is associated with a first layer and a second layer; storing first tracking data representing that the first layer and the second layer have been transferred to the destination computer system; receiving a first request to transfer a second container image to the destination computer system, wherein the second container image includes the first layer and a third layer; and based on receiving the first request, generating second transfer data associated with the second container image based on the first tracking data, wherein the second transfer data includes the third layer and a first indication that the second container image is associated with the first layer.

20 Claims, 7 Drawing Sheets

TECHNIQUES FOR SECURE TRANSFER OF CONTAINER IMAGES BY TRACKING LAYER TRANSFERS

BACKGROUND

In computing environments, developers often package and distribute software applications as container images. A container image may include all the executable code, libraries, settings, and dependencies required to run an application in a self-contained manner across different computing environments. Container images may enable software to be quickly deployed and executed on any system with a compatible container runtime engine.

A key benefit of containers is that multiple containerized applications can share an operating system kernel and computing resources on the same host machine while remaining isolated from each other. This differs from virtual machines, which require a full operating system stack for each virtual machine instance. Containers are thus more lightweight and efficient for deploying modular applications.

Container images are composed of layered filesystems. Each layer may include files representing a portion of the overall software stack. For example, a base layer may contain the core operating system libraries and settings, a second layer may install a web server runtime, a third layer may add application code, and a fourth layer may configure application settings.

However, existing methods for distributing and deploying container images across different systems have several drawbacks. Transferring large multi-layer container images over networks or using offline techniques may require substantial bandwidth and/or storage space. This problem is more severe when sending many copies of duplicate shared layers. Additionally, there is a need to address security challenges presented by a lack of image integrity verification methods across various systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
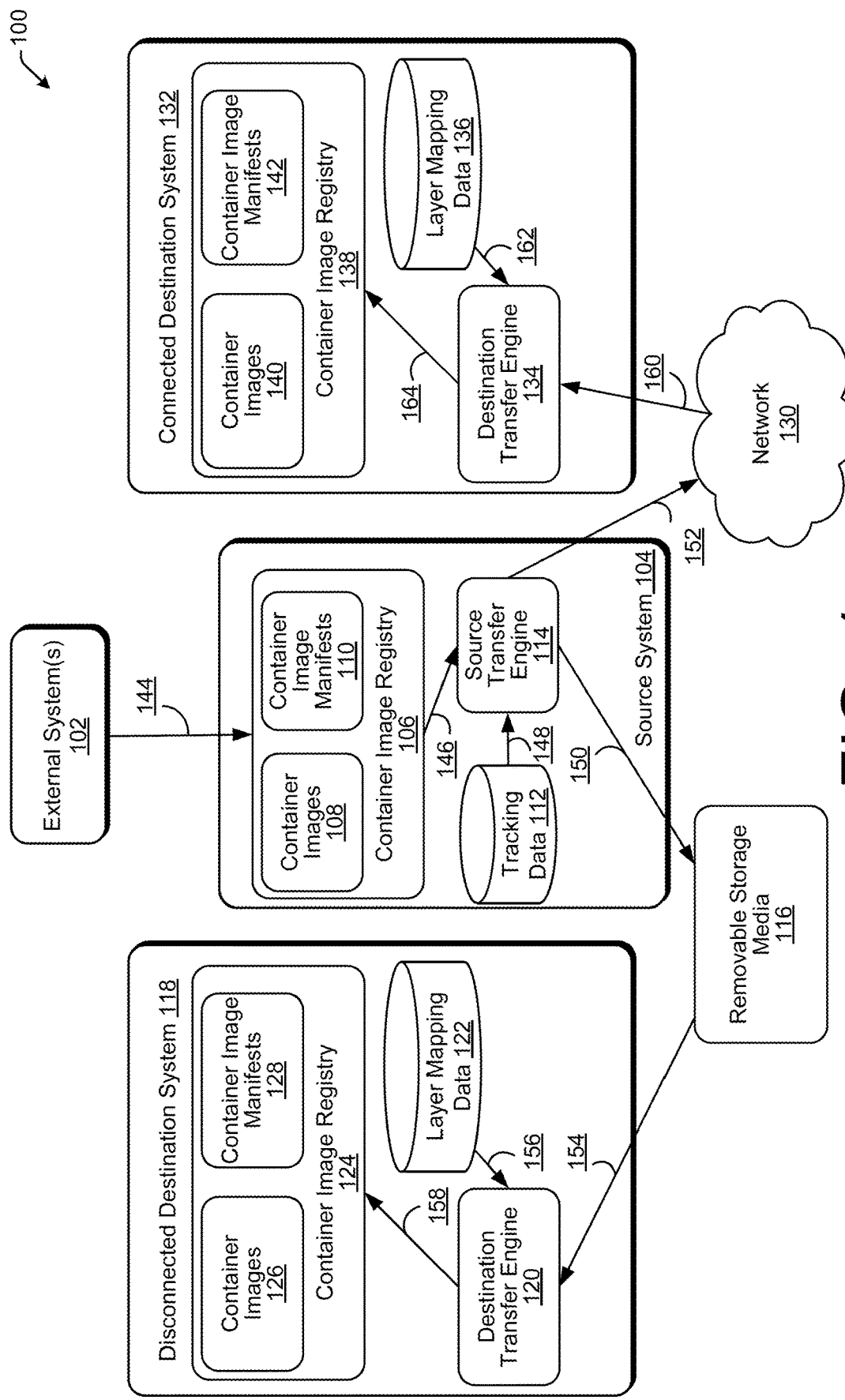
FIG. 1 provides an example architecture for enabling the transfer of container image(s) by temporally tracking the transfer of container image layers.

This document describes techniques for transferring container images from one system (e.g., a source computer system) to another system (e.g., a destination computer system). A container image may include all of the data configured to execute a software component, including the executable code associated with executing the software component within a runtime environment, the executable code configured to set up the runtime environment (e.g., an operating system software) for executing the software component, the executable code associated with any software components that should be installed in the runtime environment before executing the software component, the executable code associated with any software libraries required for execution of the software component, and/or the execution code associated with any modifications to settings of the runtime environment required for execution of the software component.

A container image may include one or more layers. A container image layer may be an immutable segment of the executable code associated with a container image. The executable code associated with a container image may thus include one or more layers. For example, a first layer of a container image may correspond to setting up a virtual machine with a particular operating system, a second layer of the container image may correspond to installing a software application on the virtual machine, a third layer of the container image may correspond to changing one or more settings of the software application, and a fourth layer of the container image may correspond to executing a software code using the software application installed on the virtual machine as modified by the settings modifications. Accordingly, by dividing the code associated with a container image into a set of layers, an example system may ensure that each step of building the container image can be reused across multiple builds.

In some cases, an example system (e.g., the source computer system or the destination computer system) stores data associated with a container image on a container image repository. Examples of container image repositories include Docker Hub, Google Container Registry, or AWS Elastic Container Registry. In some cases, the system stores a container manifest associated with a container image on the container image repository. The container manifest may be a file (e.g., a structured file, such as JavaScript Object Notation (JSON) file) that stores the following about the corresponding container image: (i) identifiers of the layers associated with the corresponding container image, (ii) data representing (e.g., a reference to another file that describes) configuration data (e.g., environment variables, default commands, and/or the like) associated with the corresponding container image, (iii) hashed representation(s) associated with the layers associated with the corresponding container image, (iv) data representing the computing platform type(s) supported by the corresponding container image, or (v) data representing (e.g., a reference to another file that includes references to) one or more other manifests associated with the container image (e.g., one manifest per computing platform type).

In some cases, the techniques described herein relate to generating transfer data for transferring a container image to a destination computer system based on determining that one or more layers of the container image have previously been part of transfer data provided to the destination computer system. Consider a scenario in which an example system (e.g., a source computer system) first transfers data associated with a container image that is associated with layers A and B to the destination computer system. If the example system subsequently receives a request to transfer a second container image that is associated with layers A and C, the example system may generate the transfer data associated with the second container image in a way that such transfer data excludes contents of layer A and instead includes an indication that the second container image is associated with layer A. This may eliminate the need to re-transfer a previously transferred layer and thus reduce the size of the transfer data generated by the example system.

In some cases, a first system (e.g., the source computer system) maintains tracking data that represents which container image layers have previously part of transfer data provided to a second system (e.g., the destination computer system). The tracking data may be maintained (e.g., in the container image repository) as metadata associated with container image layer(s). For example, the container image repository may store a value associated with a container image layer that represents at least one of: (i) whether the container image has part of transfer data provided to the second system, or (ii) the date at which the container image has part of transfer data provided to the second system.

In some cases, no networked connection exists between the first and second systems. When the two systems are disconnected, the tracking data may represent whether the first system has received transfer data associated with a container image that contains a particular container image repository. Accordingly, if the two systems are fully disconnected, then the first system may assume that the second system has received transfer data successfully after generating such transfer data (e.g., unless otherwise indicated by a user and/or by a third system that has a network connection to the second system).

In some cases, a unidirectional networked connection exists for transferring data from the second to the first system, but not vice versa. When the two systems are unidirectionally connected, the tracking data may represent whether the second system has provided an indication of successful receipt of a container image that includes a particular container image repository. For example, after generating the transfer data associated with a container image, the first system may store the transfer data on a removable storage medium. After a user stores the transfer data on the second system and the second system uses the transfer data to store the corresponding container image on a container image repository, the second system may use the unidirectional networked connection to provide an indication of receipt of the container image layer(s) associated with the corresponding container image to the first system. After receiving the indication, the first system may update its tracking data to represent successful receipt of each container image layer in the corresponding container image by the second system.

In some cases, the techniques described herein enable using container image manifests associated with two or more container images that share at least one container image layer to generate transfer data associated with the two container images. In some cases, when two or more container images share a particular container image layer, then an example system (e.g., a source computer system) may generate the transfer data for the two or more container images by including the shared layer once. This reduces the size of transfer data when the transferred container images share at least one container image layer. Inclusion of the shared layer once may be performed without the need to specify the two or more container images as parameters of a single command. In some cases, if a layer is known to have been transferred at any time previously, the layer is not included in future transfers.

For example, consider a scenario where a first container image for a web application has four layers: a base operating system layer, a web server layer, an application code layer, and a configuration layer. A second container image for a database also has four layers: the same base operating system layer, a database server layer, the same application code layer, and a different configuration layer. To transfer these two images, the source system may inspect their manifests and detect the common base operating system and application code layers. The source system may generate transfer data with the base operating system and application code layers included only once. The destination system may receive the transfer data and reconstruct the two full container images, including the shared layers.

In some cases, the transfer data associated with a set of container images includes each container image manifest associated with the set. A container image manifest may in turn indicate identifier(s) of the container image layer(s) associated with a corresponding image and a hierarchical configuration of those container image manifests. Accordingly, in some examples, an example system (e.g., the destination computer system) may use container image layer(s) provided by another system (e.g., the source computer system) along with container image manifest(s) provided by the other system to reconstruct container image(s) associated with the manifest(s). A container image manifest may represent data associated with a hierarchy of layers associated with a respective image (e.g., for each associated layer, a position of the layer in the hierarchy of layers).

In some cases, the techniques described herein enable generating, as part of the transfer data associated with a container image, a hashed representation of each container image layer in the container image. In some cases, an example system (e.g., the source computer system and/or an external system such as a container management system or a vendor system) maintains a private key that may operate as an input to a one-way hash function. The one-way hash function may process the private key (e.g., as well as content data associated with a container image) to generate the hashed representation. The example system may then include the hashed representation and/or the public key associated with the one-way hash function as part of the transfer data generated by the example system. This may enable another system (e.g., the destination computer system) to authenticate the container image layer by determining whether the hashed representation is a verified hash for the container image layer given the public key. In some cases, authenticating the container image layer includes at least one of the following operations: (i) verifying that the public key associated with the container image layer is credible (e.g., is associated with one of a set of credible container image tools), or (ii) verifying that the content data associated with the container image layer, when processed using the public key, indicates that the hashed representation is a verified hash for the container image.

Accordingly, in some cases, the techniques described herein enable the use of asymmetric hashing solutions to authenticate container image layers. In some cases, these solutions maintain private keys on a first system (e.g., a source computer system) and public keys on a second system (e.g., a destination computer system). In this way, the second system can determine, using the public keys and without access to the private keys, whether hashed representations generated using the private keys are authentic. The public keys enable verification operations, while the private keys enable hashing operations.

In some cases, either or both the source computer system and the destination computer system can use the hashed representation of a container image layer to authenticate the container image layer. For example, a user of the source computer system can (e.g., using an authentication command) trigger authentication of one or more container image layers in the source system's repository. Based on receiving this trigger, the source computer system may retrieve public key(s) and hashed representation(s) of the container image layers stored in the repository to determine which (if any) of those layers fail verification. The source computer system may then display the list of layers that failed verification to the user and/or may remove those layers that failed verification.

As another example, a user of the destination computer system can (e.g., using an authentication command) trigger authentication of one or more container image layers in the destination system's repository. Based on receiving this trigger, the destination computer system may retrieve public key(s) and hashed representation(s) of the container image layers stored in the repository to determine which (if any) of those layers fail verification. The destination computer system may then display the list of layers that failed verification to the user and/or may remove those layers that failed verification.

As an additional example, upon receiving transfer data, the destination computer system may retrieve public key(s) and hashed representation(s) of the container image layers associated with the received transfer data to determine which (if any) of those layers fail verification. The destination computer system may then display the list of layers that failed verification to the user, remove those layers that failed verification, and/or refuse to accept the transfer of those layers that failed verification.

In some cases, the techniques described herein enable efficient transfer of container images between systems by detecting and eliminating duplicate layers. By inspecting the manifests of multiple container images, a system can identify common layers and generate transfer data with these duplicate layers included only once, reducing the amount of data that needs to be transferred. This is especially advantageous when transferring a large number of related container images that share base layers.

In some cases, the techniques described improve the security of storing and/or transferring container images by authenticating container image layers using asymmetric cryptographic hashing. Private keys are used to generate hashed representations of layers on the source system. In some cases, transfer data includes public keys and/or hashed representations associated with the transferred layers. The destination system can then verify the integrity of received layers by checking that their hashes match the transferred public keys. This provides a way to detect corruption or tampering of layer data during transfer.

In some cases, the techniques described herein enable efficient transfer of container images across time and between systems by tracking data on the source system to represent which layers have already been transferred to the destination. This tracking prevents resending container layers that the destination has already received, further optimizing the transfer process. Accordingly, the techniques described herein may improve efficiency of container image transfer.

While various techniques are described in relation to generating transfer data for transferring container image(s) between two systems that are not connected via a network (also referred to transferring container image(s) across an "air-gapped environment"), a person of ordinary skill in the relevant technology will recognize that at least some of the techniques described herein can be independent of an air-gapped environment and can be used for generating transfer data for transferring container image(s) between two systems that are connected (e.g., via a unidirectional and/or a bidirectional network connection). Moreover, while various techniques are described in relation to storing transfer data on a removable storage medium (e.g., a flash drive, a compact disk (CD), and/or a floppy disk), a person of ordinary skill in the relevant technology will recognize that a system can transmit the transfer data via a networked connection to another system.

FIG. 1 provides an example architecture 100 for enabling transfer of container image(s) by temporally tracking transfer of container image layers. As depicted in FIG. 1, architecture 100 includes one or more external systems 102, a source system 104, a disconnected destination system 118, and a connected destination system 132. In architecture 100, the disconnected system 118 is not connected to a network that includes the source system 104 (e.g., is not connected to any networks), while connected system 132 is connected to network 130 which connects the source system 104 to the connected system 132. The disconnected system 118 may operate in an air-gapped environment characterized by the absence of any external network connections. An external network connection may be a network connection to one or more computing entities outside of a computing environment.

As depicted in FIG. 1, at operation 144, the external systems 102 provide container image layers to the source system 104. The source system 104 may then generate the container images 108 based on the received container image layers and store the container images 108 along with corresponding container image manifests 110 in the container image repository 106. In some cases, the container image repository 106 includes a database and/or a file system.

At operation 146, a source transfer engine 114 of the source system 104 retrieves container image layers and container image manifests 110 for a first container image and a second container image from the container image repository 106. The source transfer engine 114 may receive a request to transfer the first container image to the disconnected system 118 and, in response, query the container image repository for the manifest and/or the layers associated with the first container image. The source transfer engine 114 may receive a request to transfer the second container image to the connected system 132 and, in response, query the container image repository for the manifest and/or the layers associated with the second container image.

At operation 148, the source transfer engine 114 retrieves tracking data 112 associated with the container image layers of the first container image and the second container image. The tracking data 112 may represent which of the container image layers associated with the first container image have previously been transmitted to the disconnected system 118 and which of the container image layers associated with the second container image have previously been transmitted to the connected system 132. In some cases, the tracking data represents which container image layers have been successfully transferred and/or successfully included among transfer data configured to be transferred to another system (e.g., to the disconnected system 118 and/or the connected system 132).

At operation 150, the source transfer engine 114 uses the retrieved tracking data 112 to determine which of the container image layers associated with the first container image have already part of transfer data provided to the disconnected system 118. The source transfer engine 114 then generates transfer data that includes: (i) those container image layers associated with the first container image that have not been part of transfer data provided to the disconnected system 118, and (ii) an indication that the first container image includes those container image layers associated with the first container image that have part of transfer data provided to the disconnected system 118. The indication may, for example, include at least a subset of the container image manifest associated with the first container image. After generating the transfer data associated with the first container image, the source transfer engine 114 stores the transfer data on one or more removable storage media 116, since there is no network connection between the source system 104 and the disconnected system 118.

At operation 152, the source transfer engine 114 uses the retrieved tracking data 112 to determine which of the container image layers associated with the second container image have already part of transfer data provided to the connected system 132. The source transfer engine 114 then generates transfer data that includes: (i) those container image layers associated with the second container image that have not been part of transfer data provided to the connected system 132, and (ii) an indication that the second container image includes those container image layers associated with the second container image that have part of transfer data provided to the connected system 132. The indication may, for example, include at least a subset of the container image manifest associated with the second container image. After generating the transfer data associated with the second container, the source transfer engine 114 transmits the transfer data to the connected system 132 using network 130, since there is a network connection between the source system 104 and the connected system 132.

At operation 154, a destination transfer engine 120 of the disconnected system 118 retrieves the transfer data associated with the first container image from the removable storage media 116. A user may insert the removable storage media 116 to the disconnected system 118 and cause the destination transfer engine 120 to load the data on the removable storage media 116.

At operation 156, the destination transfer engine 120 retrieves layer mapping data 122 that includes identifiers for those container image layers that have already part of transfer data provided to the disconnected system 118. After determining identifiers for the previously transferred layers, the destination transfer engine 120 may use the identifiers to retrieve those previously transferred layers.

At operation 158, the destination transfer engine 120 generates the first container image by combining: (i) the container image layers associated with the first container image that are retrieved from the removable storage media 116, and (ii) the container image layers associated with the first container image retrieved from a storage medium (e.g., a cache storage medium) associated with the disconnected system 118 based on the identifiers determined at operation 156. The destination transfer engine 120 then stores the first container image as part of the container images 126 stored on the container image repository 124. The destination transfer engine 120 also generates a container image manifest for the first container image that the destination transfer engine 120 may store as part of the container image manifests 128 stored on the container image repository 124.

At operation 160, a destination transfer engine 134 of the connected system 132 retrieves the transfer data associated with the first container image from the network 130. The destination transfer engine 120 may receive the transfer data using a File Transfer Protocol (FTP) connection.

At operation 162, the destination transfer engine 134 retrieves layer mapping data 136 that includes identifiers for those container image layers that have already part of transfer data provided to the connected system 132. After determining identifiers for the previously transferred layers, the destination transfer engine 134 may use the identifiers to retrieve those previously transferred layers.

At operation 164, the destination transfer engine 134 generates the second container image by combining: (i) the container image layers associated with the second container image that are retrieved from network 130, and (ii) the container image layers associated with the first container image retrieved from a storage medium (e.g., a cache storage medium) associated with the connected system 132 based on the identifiers determined at operation 162. The destination transfer engine 134 then stores the second container image as part of the container images 140 stored on the container image repository 138. The destination transfer engine 134 also generates a container image manifest for the second container image that the destination transfer engine 134 may store as part of the container image manifests 142 stored on the container image repository 138.

Figure 2:
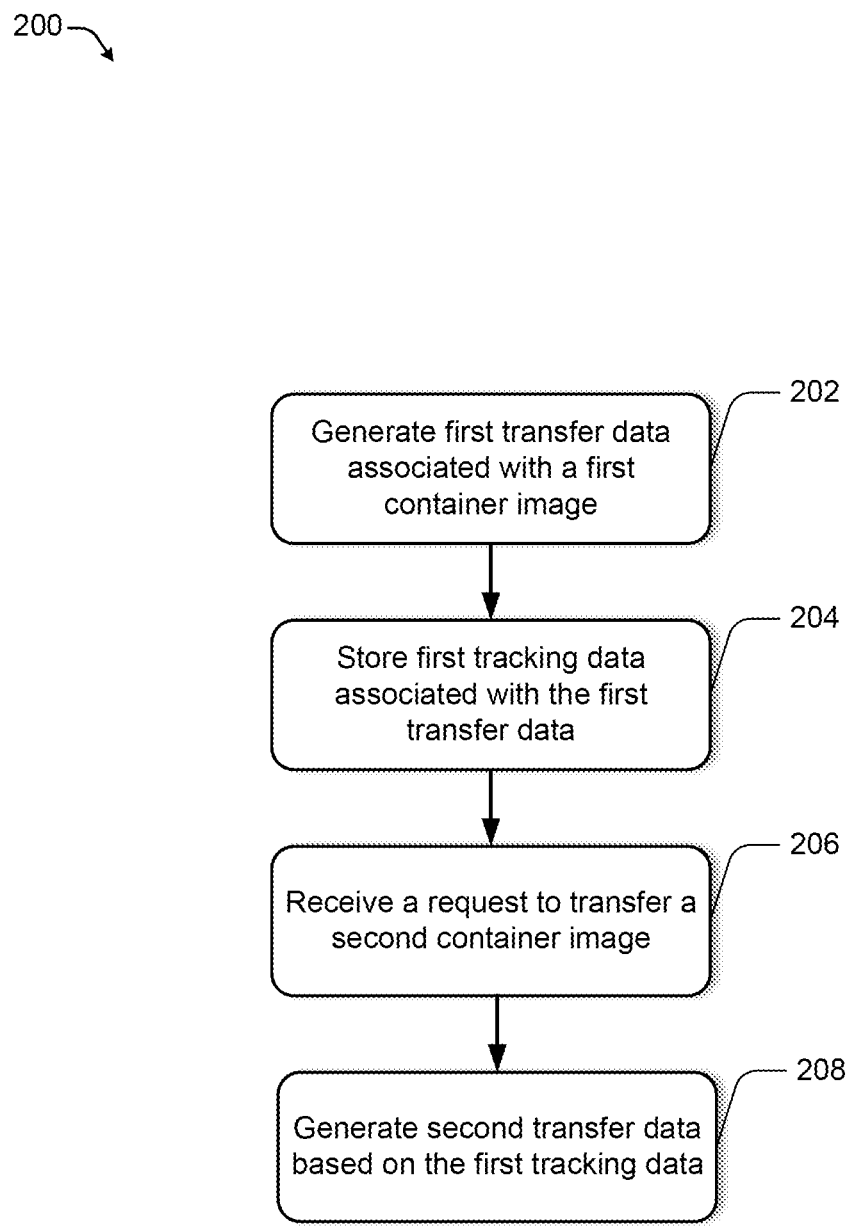
FIG. 2 is a flowchart diagram of an example process for generating transfer data associated with two container images.

FIG. 2 is a flowchart diagram of an example process 200 for generating transfer data associated with two container images. The process 200 may, for example, be performed by a source computer system, such as the source system 104 of FIG. 1.

As depicted in FIG. 2, at operation 202, an example system generates first transfer data associated with a first container image. The first container image may be associated with a first container image layer and a second container image layer. The first transfer data may include both the first container image layer and the second container image layer. In some cases, the first transfer data may include each container image layer associated with the first container image that has not previously part of transfer data provided to a destination system, as determined based on tracking data maintained by the example system.

At operation 204, the example system stores first tracking data associated with the first transfer data. The first tracking data may represent that the first container image layer and the second container image layer have part of transfer data provided to the destination system. The first tracking data may represent that each container image layer associated with the first container image has part of transfer data provided to the destination system.

At operation 206, the example system receives a request to transfer a second container image to the destination system. The second container image may be associated with the first container image layer a third container image.

At operation 208, the example system generates second transfer data associated with the second container based on the first tracking data. In some cases, the second transfer data includes an indication that the first container image layer has previously part of transfer data provided to the destination system, as the first tracking data represents such a previous transfer. The indication may, for example, be at least a subset of the manifest associated with the second container image that includes that the second container image is associated with an identifier of the first container image.

In some cases, the second transfer data includes the third container image layer if the first tracking data represents that the third container image layer has previously not been part of transfer data provided to the destination system. In some cases, the second transfer data: (i) for each container image layer that has previously not been part of transfer data provided to the destination system, the container image itself, (ii) for each container image layer that has previously been part of transfer data provided to the destination system, an indication that the contain image layer is associated with the second container image. In some cases, after generating the second transfer data, the example system either stores the transfer data on a removable storage medium (e.g., if the destination system is a disconnected destination system) or transmits the transfer data to the destination system using a network (e.g., if the destination system is a connected destination system).

Figure 3:
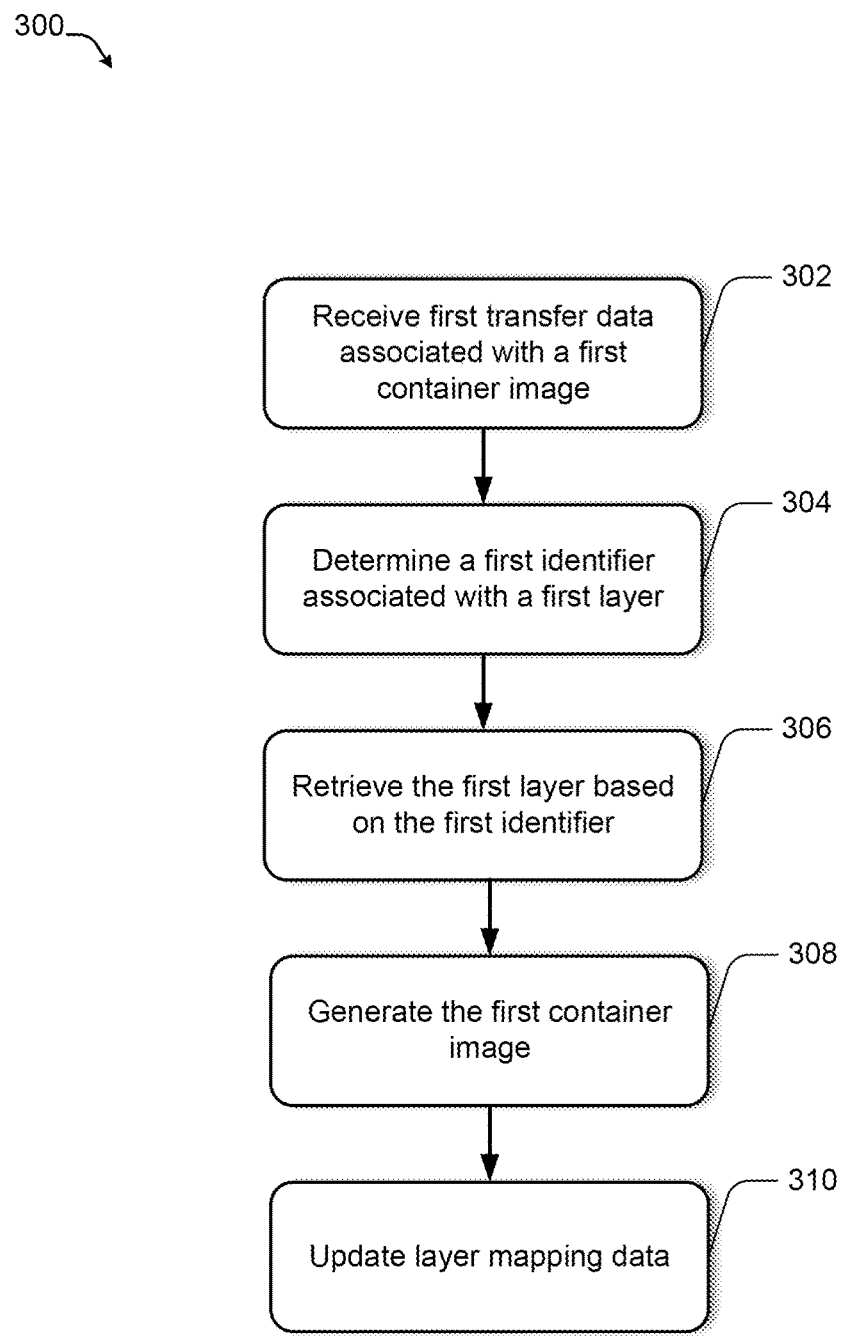
FIG. 3 is a flowchart diagram of an example process for receiving transfer data associated with a first container image.

FIG. 3 is a flowchart diagram of an example process 300 for receiving transfer data associated with a first container image. The process 300 may, for example, be performed by a destination system, such as at least one of the disconnected destination system 118 or the connected destination system 132 of FIG. 1.

As depicted in FIG. 3, at operation 302, an example system receives first transfer data associated with a first container image. The first container image may be associated with a first container image layer and a second container image layer. The first transfer data may include an indication that the first container image is associated with the first layer. The first transfer data may also include container image data associated with a second layer. Container image data may include payload data associated with the second layer, such as at least one of a filesystem snapshot associated with the second layer or application code associated with the second layer.

At operation 304, the example system determines a first identifier associated with the first layer based on layer mapping data maintained by the example system. In some cases, after determining that the first container image is associated with the first layer, the example system may query layer mapping data to determine whether the example system has previously received the first layer. Layer mapping data may represent identifiers for those container image layers that the example system has previously received. After determining that the example system has previously received the first layer, the example system may retrieve the identifier for the first layer.

At operation 306, the example system retrieves the first layer based on the identifier for the first layer. The example system may retrieve the first layer based on data stored in a container image repository accessible by the example system and/or data stored in a cache storage medium accessible by the example system.

At operation 308, the example system generates the first container image based on the retrieved first layer and the second layer provided as part of the first transfer data. In some cases, the first transfer data includes a manifest of the first container image that represents the container image layers associated with the first container image (e.g., represents a hierarchy of container image layers associated with the first container image). In some cases, the example system generates the first container image based on the configuration data provided in the manifest. In some cases, the example system stores the first container image and/or the corresponding manifest in a container image repository accessible by the example system and/or data stored in a cache storage medium accessible by the example system.

At operation 310, the example system updates layer mapping data. In some cases, the example system updates the layer mapping data to represent that the example system has received the first layer. In some cases, the example system updates the layer mapping data to represent an identifier of the first layer.

Figure 4:
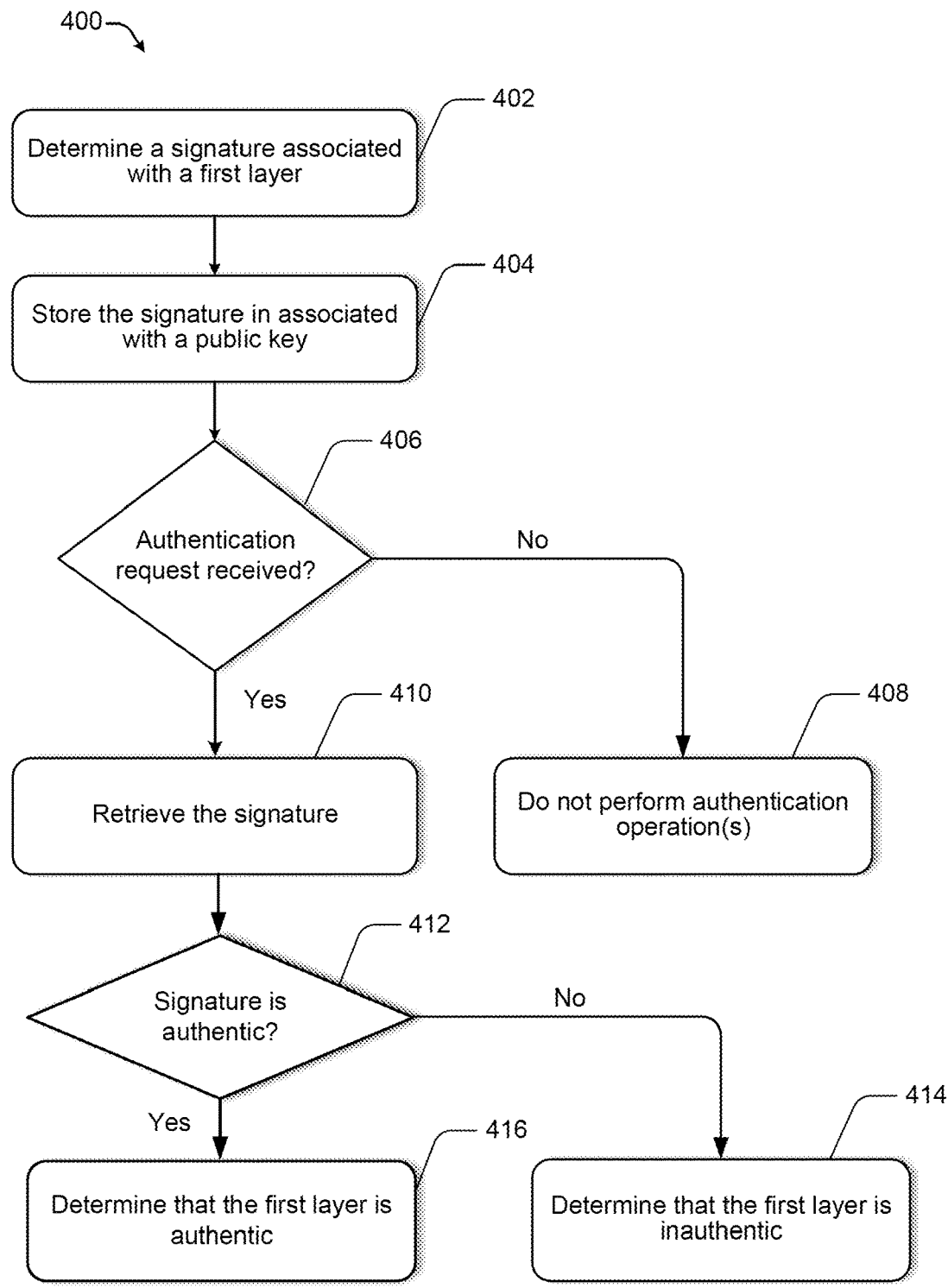
FIG. 4 is a flowchart diagram of an example process for authenticating a container image layer stored in a container image repository.

FIG. 4 is a flowchart diagram of an example process 400 for authenticating a container image layer stored in a container image repository. The process 400 may be performed by any system that can access (e.g., stores) a container image layer, such as at least one of the source system 104, the disconnected destination system 118, or the connected destination system 132 of FIG. 1.

As depicted in FIG. 4, at operation 402, an example system determines a signature associated with a first layer that is stored in a container image repository. The example system may determine the request by processing content data (e.g., payload data, application code data, and/or the like) associated with the first layer using a hash function. The inputs to the hash function may include a private key, such as a private key associated with the container image repository and/or with a developer of the container image layer.

At operation 404, the example system stores the signature associated with the first layer in the container image repository. In some cases, the example system stores the signature along with and/or in association with a public key, such as a public associated with the container image repository and/or with a developer of the container image layer.

At operation 406, the example system determines whether the example system has received a request to authenticate the first layer. The request may be a request to authenticate each container image stored in the container image repository. The request may, for example, be provided by a command provided by a user using a command-line interface. In some cases, the example system and/or another system periodically triggers the request. If the example system does not receive a request to authenticate the first layer (operation 406—No), then the example system proceeds to operation 408 to abort the authentication operation. If the example system receives receive a request to authenticate the first layer (operation 406—Yes), then the example system proceeds to operation 410 to retrieve the signature associated with the first layer. In some cases, the example system retrieves the signature and/or the public key associated with the first layer from the container image repository.

At operation 412, the example system determines whether the signature associated with the first layer is authentic. In some cases, the example system processes the content data associated with the first layer based on the public key to determine a generated signature and determines whether the generated signature matches the retrieved signature. In some cases, if the generated signature matches the retrieved signature, the example system determines that the retrieved signature is authentic. In some cases, if the generated signature fails to match the retrieved signature, the example system determines that the retrieved signature is inauthentic.

If the example system determines that the retrieved signature is inauthentic (operation 412—No), then the example system proceeds to operation 414 to determine that the first layer fails verification and is inauthentic. If the example system determines that the retrieved signature is authentic (operation 412—Yes), then the example system proceeds to operation 416 to determine that the first layer passes verification and is authentic. The example system may then display a list of container image layers stored in a container image repository that fail and/or pass authentication operations.

Figure 5:
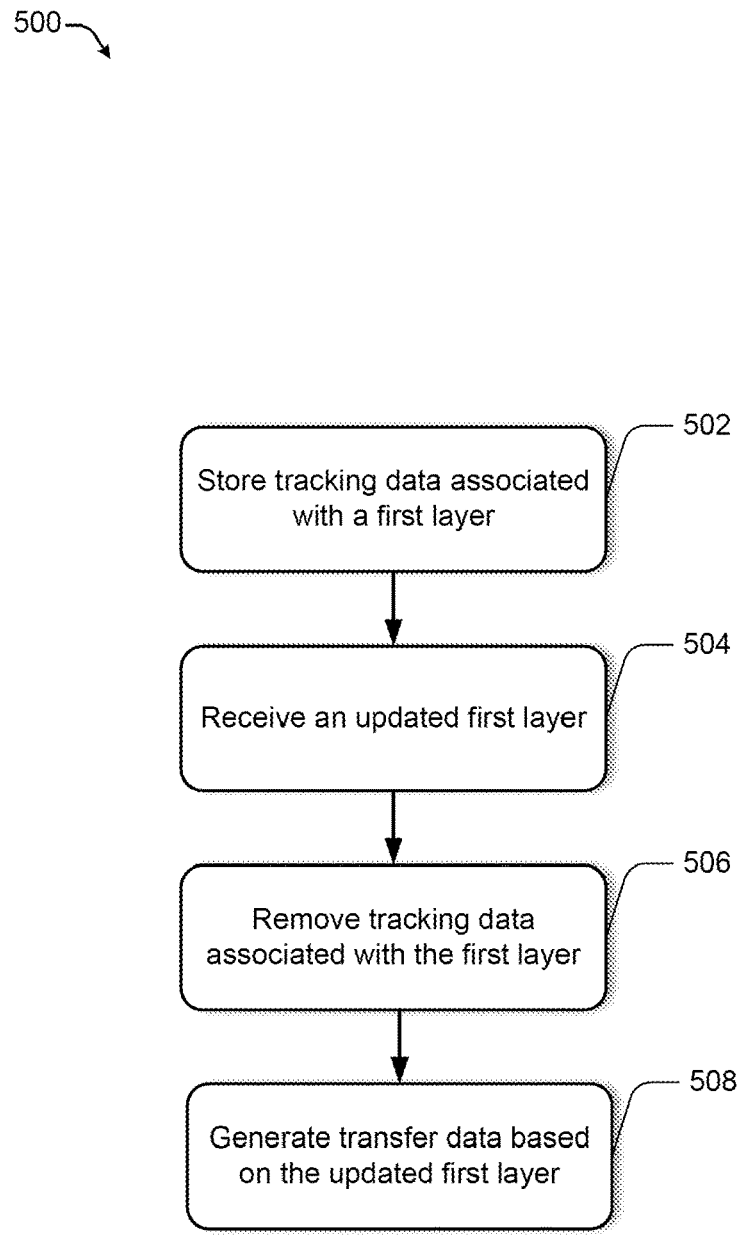
FIG. 5 is a flowchart diagram of an example process for processing an update to a previously transferred container image layer.

FIG. 5 is a flowchart diagram of an example process 500 for processing an update to a previously transferred container image layer. The process 500 may, for example, be performed by a source computer system, such as the source system 104 of FIG. 1.

As depicted in FIG. 5, at operation 502, an example system stores tracking data associated with a first layer. The example system may store the tracking data after generating transfer data that includes the first layer and/or after receiving an indication from a destination system that the destination system has received the first layer.

At operation 504, the example system receives an updated first layer. The updated first layer may include one or more updates (e.g., one or more security patches) associated with the first layer. For example, the example system may receive an operating system update.

At operation 506, the example system removes tracking data associated with the first layer. The tracking data may represent that the first layer has been part of transferred data provided to and/or has been transferred to the destination system. In some cases, because the previously transferred version of the first layer is no longer up to date considering the received update, the example system may remove the tracking data associated with the first layer.

At operation 508, the example system generates transfer data based on the updated first layer. In some cases, the example system generates transfer data that includes the first layer as well as the manifests for each container image that is associated with the first layer.

Figure 6:
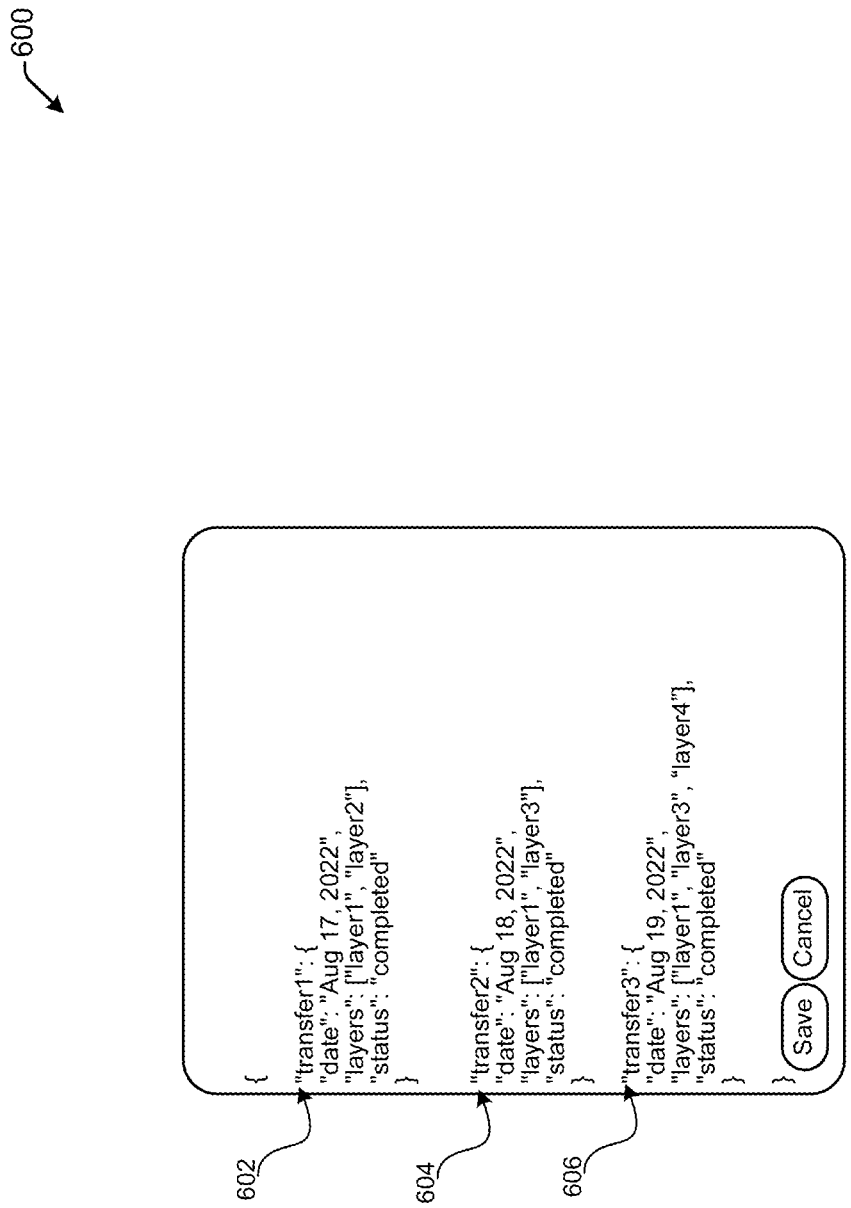
FIG. 6 provides an operational example of tracking data that may be maintained by a system.

FIG. 6 provides an operational example of tracking data 600 that may be maintained by a system. The tracking data 600 (e.g., tracking data 112 of FIG. 1) may be maintained by a source computer system, such as the source system 104 of FIG. 1.

The tracking data 600 of FIG. 6 includes three transfer records, where each record describes data associated with the transfer of a container image to a destination system. Specifically, each transfer record describes the transfer date, the transfer status, and the container image layers of a respective container image.

Accordingly, transfer record 602 describes transfer date, the transfer status, and the container image layers of a respective container image that includes a first container image layer and a second container image layer. Furthermore, transfer record 604 describes transfer date, the transfer status, and the container image layers of a respective container image that includes the first container image layer and a third container image layer. Moreover, transfer record 606 describes transfer date, the transfer status, and the container image layers of a respective container image that includes the first container image layer, the third container image layer, and a fourth container image layer. In some cases, a transfer record describes (e.g., only describes) which layer(s) of a container image have been transferred and/or which layer(s) of a container image have not been transferred.

Figure 7:
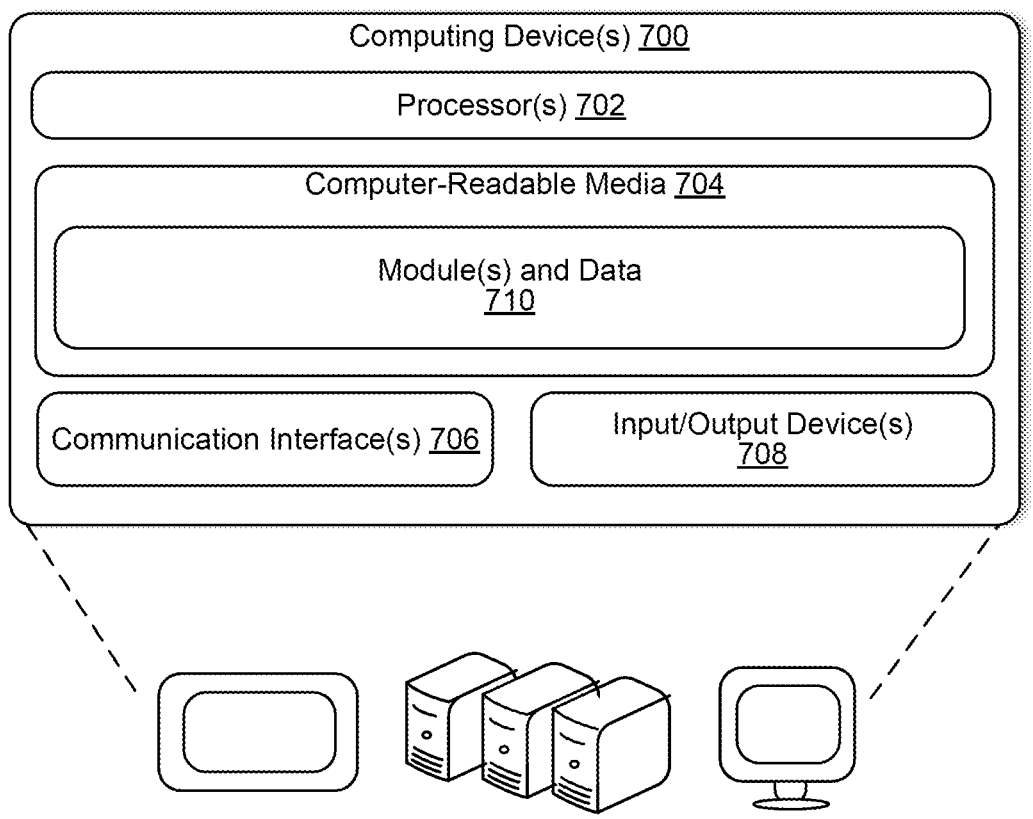
FIG. 7 illustrates example computing device(s) for performing techniques described herein.

FIG. 7 illustrates example computing device(s) 700 for performing techniques described herein. The computing device(s) 700 can comprise user device(s) including, but not limited to, mobile phone(s), personal digital assistant(s), netbook(s), laptop computer(s), desktop computer(s), networked computer(s), and/or any another electronic device(s) that can transmit or receiving data), server computing device(s). In some examples, the computing device(s) 700 can comprise server computing device(s) (e.g., server(s)), which can be any type of server, such as a network-accessible server. In some examples, the server(s) can be stand-alone computing systems, distributed-computing systems, networked-computing systems, etc. For instance, in at least one example, one or more of the functionalities described herein as being performed by the server(s) can be performed by a single device or multiple devices. In some examples, one or more of the functionalities described herein can be performed one or more remotely located devices instead of, or in addition to, the server(s).

In at least one example, the computing device(s) 700 can include processor(s) 702, computer-readable media 704, communication interface(s) 706, and input/output device(s) 708.

The processor(s) 702 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 702 can execute one or more modules and/or processes to cause the computing device(s) 700 to perform a variety of functionalities, as set forth above and explained in further detail in the following disclosure. Additionally, each of the processor(s) 702 can possess its own local memory, which also can store program modules, program data, and/or one or more operating systems.

Computer-readable media can include volatile memory, nonvolatile memory, and/or other persistent and/or auxiliary computer-readable media, removable and non-removable computer-readable media implemented in any method or technology for storage of data such as computer readable instructions, data structures, program modules, or other data. Computer memory is an example of computer-readable media. Thus, computer-readable media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain data for access by a computing device.

In at least one example, computer-readable media can include non-transitory computer-readable media. Non-transitory computer-readable media can include volatile and nonvolatile, removable and non-removable tangible, physical media implemented in technology for storage of data, such as computer readable instructions, data structures, program modules, or other data. The computer-readable media 704 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired data and which can be accessed by the computing device(s) 700. Any such non-transitory computer-readable media can be part of the computing device(s) 700.

In contrast, communication media includes computer readable instructions, data structures, program modules, or other data in a modulated data signal, such as a carrier wave, or other transmission mechanism. As defined herein, computer-readable media does not include communication media.

In at least one example, the computer-readable media 704 can store module(s) and data 710. The module(s) and data 710 can be in the form of stand-alone applications, productivity applications, an operating system component, or any other application or software module. In various examples, the computer-readable media 704 can represent removable storage media configured to enable transfer of various data and images, which, for example, can include container images, including for transfer to a computer system without using a networked connection.

The communication interface(s) 706 can include one or more interfaces and hardware components for enabling communication with various other devices, such as over network(s) or directly. For example, communication interface(s) 706 can enable communication through one or more networks, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, low power area networks (LPWAN) or any other such network, or any combination thereof. Components used for such communications can depend at least in part upon the type of network, the environment selected, or both. Protocols for communicating over such networks are well known and will not be discussed herein in detail.

In at least one example, the one or more input/output (I/O) devices 708 can include speakers, a microphone, a camera, a display, a haptic output device, various user controls (e.g., buttons, a joystick, a keyboard, a keypad, etc.), and so forth.

CONCLUSION

While one or more examples of the techniques described herein have been described, various alterations, additions, permutations, and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation can be used in conjunction with components or steps of other examples. For example, the components and instructions of FIG. 7 can utilize the processes and flows of FIGS. 1-6.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some examples the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural data items and/or methodological acts, it is to be understood that the subject matter defined in the appended claims is not necessarily limited to the specific data items or acts described. Rather, the specific data items and acts are disclosed as example forms of implementing the claims.

Example Clauses

While the example clauses described below are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

A: A system comprising: one or more processors; and one or more computer-readable media storing computer executable instructions that, when executed, cause the system to perform operations comprising: generating first transfer data associated with transferring a first container image to a destination computer system, wherein the first container image is associated with a first layer and a second layer, and wherein the first transfer data comprises the first layer and the second layer; based at least in part on generating the first transfer data, storing first tracking data representing that the first layer and the second layer have been transferred to the destination computer system; receiving a first request to transfer a second container image to the destination computer system, wherein the second container image comprises the first layer and a third layer; and based on receiving the first request, generating second transfer data associated with the second container image based on the first tracking data, wherein the second transfer data comprises the third layer and a first indication that the second container image is associated with the first layer.

B: The system of paragraph A, wherein the second transfer data comprises a signature associated with the first layer, and the operations further comprise: determining the signature based on the first layer and a private key associated with the first layer.

C: The system of paragraph A or B, the operations further comprising: determining a signature associated with the first layer based on the first layer and a private key associated with the first layer; storing the first layer in association with the signature and a public key associated with the private key in a repository; receiving a second request to determine whether the first layer is authentic; based on receiving the second request, retrieving the signature and the first layer from the repository; and determining, based on the first layer and the public key, that the first layer is authentic.

D: The system of any of paragraphs A-C, wherein the first indication represents a position of the first layer in a hierarchy of container image layers associated with the second container image.

E: The system of any of paragraphs A-D, the operations further comprising: receiving an updated first layer; and generating third transfer data, wherein the third transfer data comprises the updated first layer, a second indication that the first container image is associated with the updated first layer, and a third indication that the first container image is associated with the updated first layer.

F: The system of any of paragraphs A-E, the operations further comprising: receiving an updated first layer; and removing the first tracking data.

G: The system of any of paragraphs A-F, the operations further comprising: storing the second transfer data on a removable storage medium, wherein the removable storage medium is configured to enable transfer of the second container image to the destination computer system without using a networked connection with the destination computer system.

H: The system of any of paragraphs A-G, wherein the destination computer system is configured to operate in an air-gapped environment characterized by absence of any external network connections.

I: A system comprising: one or more processors; and one or more computer-readable media storing computer executable instructions that, when executed, cause the system to perform operations comprising: receiving first transfer data associated with a first container image from a source computer system, wherein the first transfer data comprises a first indication that the first container image is associated with a first layer and container image data associated with a second layer; determining, based on layer mapping data, a first identifier associated with the first layer; retrieving the first layer based on the first identifier; generating the first container image based on the first layer and the second layer; and updating the layer mapping data to represent a second identifier associated with the second layer.

J: The system of paragraph I, wherein the layer mapping data is stored in a cache storage medium accessible by the system.

K: The system of paragraph I or J, wherein the first indication represents a position of the first layer in a hierarchy of container image layers associated with the first container image.

L: The system of paragraph K, wherein the first transfer data is received via a removable storage medium while the first indication is provided using a network connection between the system and the source computer system.

M: A method comprising: generating first transfer data associated with transferring a first container image to a destination computer system, wherein the first container image is associated with a first layer and a second layer, and wherein the first transfer data comprises the first layer and the second layer; based at least in part on generating the first transfer data, storing first tracking data representing that the first layer and the second layer have been transferred to the destination computer system; receiving a first request to transfer a second container image to the destination computer system, wherein the second container image comprises the first layer and a third layer; and based on receiving the first request, generating second transfer data associated with the second container image based on the first tracking data, wherein the second transfer data comprises the third layer and a first indication that the second container image is associated with the first layer.

N: The method of paragraph M, wherein the second transfer data comprises a signature associated with the first layer, and the method further comprises: determining the signature based on the first layer and a private key associated with the first layer.

O: The method of paragraph M or N, further comprising: determining a signature associated with the first layer based on the first layer and a private key associated with the first layer; storing the first layer in association with the signature and a public key associated with the private key in a repository; receiving a second request to determine whether the first layer is authentic; based on receiving the second request, retrieving the signature and the first layer from the repository; and determining, based on the first layer and the public key, that the first layer is authentic.

P: The method of any of paragraphs M-O, wherein the first indication represents a position of the first layer in a hierarchy of container image layers associated with the second container image.

Q: The method of any of paragraphs M-P, further comprising: receiving an updated first layer; and generating third transfer data, wherein the third transfer data comprises the updated first layer, a second indication that the first container image is associated with the updated first layer, and a third indication that the first container image is associated with the updated first layer.

R: The method of any of paragraphs M-Q, further comprising: receiving an updated first layer; and removing the first tracking data.

S: The method of any of paragraphs M-R, further comprising: storing the second transfer data on a removable storage medium, wherein the removable storage medium is configured to enable transfer of the second container image to the destination computer system without using a networked connection with the destination computer system.

T: The method of any of paragraphs M-S, wherein the destination computer system is configured to operate in an air-gapped environment characterized by absence of any external network connections.

What is claimed is:

1. A system comprising:
   one or more processors; and
   one or more computer-readable media storing computer executable instructions that, when executed, cause the system to perform operations comprising:
   generating first transfer data associated with transferring a first container image to a destination computer system, wherein the first container image is associated with a first layer and a second layer, and wherein the first transfer data comprises the first layer and the second layer;
   based at least in part on generating the first transfer data, storing first tracking data representing that the first layer and the second layer have been transferred to the destination computer system;
   receiving a first request to transfer a second container image to the destination computer system, wherein the second container image comprises the first layer and a third layer; and
   based on receiving the first request, generating second transfer data associated with the second container image based on the first tracking data, wherein the second transfer data comprises the third layer and a first indication that the second container image is associated with the first layer.

2. The system of claim 1, wherein the second transfer data comprises a signature associated with the first layer, and the operations further comprise:
    determining the signature based on the first layer and a private key associated with the first layer.
3. The system of claim 1, the operations further comprising:
    determining a signature associated with the first layer based on the first layer and a private key associated with the first layer;
    storing the first layer in association with the signature and a public key associated with the private key in a repository;
    receiving a second request to determine whether the first layer is authentic;
    based on receiving the second request, retrieving the signature and the first layer from the repository; and
    determining, based on the first layer and the public key, that the first layer is authentic.
4. The system of claim 1, wherein the first indication represents a position of the first layer in a hierarchy of container image layers associated with the second container image.
5. The system of claim 1, the operations further comprising:
    receiving an updated first layer; and
    generating third transfer data, wherein the third transfer data comprises the updated first layer, a second indication that the first container image is associated with the updated first layer, and a third indication that the first container image is associated with the updated first layer.
6. The system of claim 1, the operations further comprising:
    receiving an updated first layer; and
    removing the first tracking data.
7. The system of claim 1, the operations further comprising:
    storing the second transfer data on a removable storage medium, wherein the removable storage medium is configured to enable transfer of the second container image to the destination computer system without using a networked connection with the destination computer system.
8. The system of claim 1, wherein the destination computer system is configured to operate in an air-gapped environment characterized by absence of any external network connections.
9. A system comprising:
    one or more processors; and
    one or more computer-readable media storing computer executable instructions that, when executed, cause the system to perform operations comprising:
    receiving first transfer data associated with a first container image from a source computer system, wherein the first transfer data comprises a first indication that the first container image is associated with a first layer and container image data associated with a second layer;
    determining, based on layer mapping data, a first identifier associated with the first layer;
    retrieving the first layer based on the first identifier;
    generating the first container image based on the first layer and the second layer; and
    updating the layer mapping data to represent a second identifier associated with the second layer.
10. The system of claim 9, wherein the layer mapping data is stored in a cache storage medium accessible by the system.
11. The system of claim 9, wherein the first indication represents a position of the first layer in a hierarchy of container image layers associated with the first container image.
12. The system of claim 11, wherein the first transfer data is received via a removable storage medium while the first indication is provided using a network connection between the system and the source computer system.
13. A method comprising:
    generating first transfer data associated with transferring a first container image to a destination computer system, wherein the first container image is associated with a first layer and a second layer, and wherein the first transfer data comprises the first layer and the second layer;
    based at least in part on generating the first transfer data, storing first tracking data representing that the first layer and the second layer have been transferred to the destination computer system;
    receiving a first request to transfer a second container image to the destination computer system, wherein the second container image comprises the first layer and a third layer; and
    based on receiving the first request, generating second transfer data associated with the second container image based on the first tracking data, wherein the second transfer data comprises the third layer and a first indication that the second container image is associated with the first layer.
14. The method of claim 13, wherein the second transfer data comprises a signature associated with the first layer, and the method further comprises:
    determining the signature based on the first layer and a private key associated with the first layer.
15. The method of claim 13, further comprising:
    determining a signature associated with the first layer based on the first layer and a private key associated with the first layer;
    storing the first layer in association with the signature and a public key associated with the private key in a repository;
    receiving a second request to determine whether the first layer is authentic;
    based on receiving the second request, retrieving the signature and the first layer from the repository; and
    determining, based on the first layer and the public key, that the first layer is authentic.
16. The method of claim 13, wherein the first indication represents a position of the first layer in a hierarchy of container image layers associated with the second container image.
17. The method of claim 13, further comprising:
    receiving an updated first layer; and
    generating third transfer data, wherein the third transfer data comprises the updated first layer, a second indication that the first container image is associated with the updated first layer, and a third indication that the first container image is associated with the updated first layer.
18. The method of claim 13, further comprising:
    receiving an updated first layer; and
    removing the first tracking data.

19. The method of claim 13, further comprising:
storing the second transfer data on a removable storage medium, wherein the removable storage medium is configured to enable transfer of the second container image to the destination computer system without using a networked connection with the destination computer system.

20. The method of claim 13, wherein the destination computer system is configured to operate in an air-gapped environment characterized by absence of any external network connections.

\* \* \* \* \*